United States Patent [19]
Inoue et al.

[11] Patent Number: 6,095,786
[45] Date of Patent: Aug. 1, 2000

[54] SUBSTRATE FORMING MOLD, AND PLATE THICKNESS ADJUSTING METHOD OF FORMED SUBSTRATE IN SUBSTRATE FORMING MOLD

[75] Inventors: Kazuo Inoue, Osaka; Yoshihiro Kawasaki, Hirakata, both of Japan

[73] Assignee: Matsushita Electric Industrial Co., Ltd., Osaka, Japan

[21] Appl. No.: 09/087,842

[22] Filed: May 29, 1998

[30] Foreign Application Priority Data

May 30, 1997 [JP] Japan .................................. 9-142653

[51] Int. Cl.⁷ .................................................. B29C 45/26
[52] U.S. Cl. ........................ 425/190; 425/195; 425/810; 29/428; 264/39
[58] Field of Search ..................... 425/190, 195, 425/810; 264/328.1, 39; 29/428

[56] References Cited

U.S. PATENT DOCUMENTS

| | | | |
|---|---|---|---|
| 4,374,636 | 2/1983 | Holmes | 425/810 |
| 4,681,527 | 7/1987 | Amory et al. | 425/810 |
| 4,715,804 | 12/1987 | Takahashi | 425/810 |
| 4,737,096 | 4/1988 | Poorten | 425/810 |
| 5,792,492 | 8/1998 | Takahashi | 425/810 |

FOREIGN PATENT DOCUMENTS

| | | |
|---|---|---|
| 5-212755 | 8/1993 | Japan . |
| 7-266378 | 10/1995 | Japan . |

*Primary Examiner*—James P. Mackey
*Attorney, Agent, or Firm*—Ratner & Prestia

[57] ABSTRACT

A substrate forming mold for forming a substrate by filling a cavity formed between a pair of matching molds 1, 2 with resin, that is, this substrate forming mold has shims 9, 12 disposed at least between a mirror finished surface plate 6 for composing one mold 1 and a stable mold base 8, and in a region inside of a fixed abutting ring 13, depending on fluctuations of plate thickness of formed substrate. As a result, the plate thickness of formed substrate can be adjusted finely, and fluctuations occurring in the radial direction or peripheral direction of the formed substrate can be decreased.

28 Claims, 19 Drawing Sheets

SUBSTRATE FORMING MOLD, AND PLATE THICKNESS ADJUSTING METHOD OF FORMED SUBSTRATE IN SUBSTRATE FORMING MOLD

BACKGROUND OF THE INVENTION

1. Field of the Invention

The present invention relates to a substrate forming mold usable in forming a resin substrate for use in, for example, optical disk, and a plate thickness adjusting method of formed substrate in a substrate forming mold.

2. Related Art of the Invention

Hitherto, resin materials have been used in forming of substrate of optical disk as memory medium. This substrate is formed by pouring and solidifying molten resin in a gap formed between a pair of molds, stable mold and movable mold, to be coupled together.

Conventionally, therefore, the plate thickness distribution of the formed substrate was determined by the processing precision of the member for forming the molds. However, as the memory capacity of the optical disk becomes larger, a higher precision is demanded in the plate thickness of the optical disk substrate. This is because the plate thickness of the substrate must be reduced in order to decrease the effect of tilt of the substrate.

Japanese Laid-open Patent No. 7-266378 discloses a method of disposing a shim between a junction member for forming a junction surface between a stable mold and a movable mold, and a mounting template for mounting it. In this case, since the cavity thickness varies, an outer ring for forming the outside diameter of the substrate is pressed to the stamper side by an elastic member.

A sectional view of this mold is shown in FIG. 19. A stable mold 101 and a movable mold 102 are tightened, and arrested and fixed by a fixed abutting ring 103 and a movable abutting ring 104. The fixed abutting ring 103 is fitted to a fixed mounting template 105 through a shim 106. In the fixed mounting template 105, a fixed mirror finished surface plate 107, a fixed bush 108, and a sprue bush 109 are provided sequentially toward the inner circumference. On the fixed mirror finished surface plate 107, a stamper 110 is held by a stamper holder 111 and an outer ring 112, respectively, on the inner circumference and outer circumference. The outer ring 112 is designed to move in cooperation with the movable mold 102, and is hence pressed to the stamper 110 side by a spring 113 which is an elastic member. At the movable mold 102 side, the movable abutting ring 104 is fastened to a movable mounting template 114 with bolts, and a movable mirror finished surface plate 115, a movable bush 116, an ejector punch 117, a cut punch 118, and an ejector pin 119 are disposed sequentially at the inner side. The fixed mirror finished surface plate 107 and movable mirror finished surface plate 115 are respectively provided with temperature adjusting grooves 120 and 121. The plate thickness of the formed substrate is adjusted by varying the plate thickness of the shim 106.

In such conventional method disclosed in Japanese Laid-open Patent No. 7-266378, however, a shim is disposed at the position for defining the thickness of the cavity formed between both molds when the stable mold and movable mold are joined together butt to butt. Accordingly, although the entire thickness can be adjusted in the formed substrate, but it is hard to suppress fluctuations in the plane of the formed substrate, that is, fluctuations of thickness in the radial direction or peripheral direction.

In consideration of such problems of the conventional mold, it is an object of the invention to present a mold for forming a substrate capable of suppressing fluctuations of thickness of the formed substrate, and a plate thickness adjusting method of formed substrate in the substrate forming mold.

SUMMARY OF THE INVENTION

An aspect of the present invention is a substrate forming mold comprising:

a pair of substrate forming members for forming a substrate, a fixed base for holding one substrate forming member out of said pair of substrate forming members, a movable base for holding other substrate forming member out of said pair of substrate forming members, a pair of abutting members provided on said fixed base and movable base and disposed at positions for substantially enclosing said substrate forming members, abutting against each other for leaving a specified gap for forming said substrate, between the pair of substrate forming members when said pair of substrate forming members are joined together, and gap adjusting means disposed between said one substrate forming member and said fixed base and/or between said other substrate forming member and said movable base, and at the inside of said abutting members, for adjusting said gap.

A further aspect of the present invention is a substrate forming mold of said first invention, further comprising:

a cover member provided at said substrate forming member, for covering the groove for passing fluid for temperature adjustment, wherein said gap adjusting means is provided between said cover member and said fixed base or movable base.

A still further aspect of the present invention is a substrate forming mold of said first invention, wherein said abutting members are substantially annular, there is a step at the position where a junction surface of said base and said substrate forming member, contacts with the inner wall of the abutting member, and said gap adjusting means is disposed adjacently to an inner wall at said step.

Another aspect of the present invention is a substrate forming mold of said first invention, wherein a junction surface of said base and said substrate forming member has a substantially annular gap, and said gap adjusting means is disposed adjacently to an annular wall at said step.

Still another aspect of the present invention is a plate thickness adjusting method of formed substrate in a substrate forming mold comprising:

a pair of substrate forming members for forming a substrate, a fixed base for holding one substrate forming member out of said pair of substrate forming members, a movable base for holding other substrate forming member out of said pair of substrate forming members, and a pair of abutting members provided on said fixed base and movable base and disposed at positions for substantially enclosing said substrate forming members, abutting against each other for leaving a specified gap for forming said substrate, between the pair of substrate forming members when said pair of substrate forming members are joined together, wherein, for adjusting said gap, gap adjusting means is disposed between said one substrate forming member and said fixed base and/or between said other substrate forming member and said movable base, and at the inside of said abutting members.

The present invention a plate thickness adjusting method of formed substrate in a substrate forming mold of said sixteenth invention, wherein when said substrate forming members are composed by combination of plural mold constituent members, said gap adjusting means is provided between all or part of mold constituent members, out of said plural mold constituent members, and said base.

The present invention a plate thickness adjusting method of formed substrate in a substrate forming mold of said sixteenth invention, wherein when a cover member provided at said substrate forming member, for covering the groove for passing fluid for temperature adjustment is provided, said gap adjusting means is provided between said cover member and said fixed base or movable base.

The present invention a plate thickness adjusting method of formed substrate in a substrate forming mold of said sixteenth invention, wherein said abutting members are substantially annular, and if there is a step at the position where a junction surface of said base and said substrate forming member, contacts with the inner wall of the abutting member, said gap adjusting means is disposed adjacently to the inner wall at said step.

The present invention a plate thickness adjusting method of formed substrate in a substrate forming mold of said sixteenth invention, wherein a junction surface of said base and said substrate forming member has a substantially annular gap, said gap adjusting means is disposed adjacently to an annular wall at said step.

REFERENCE NUMERALS

Figure 1:
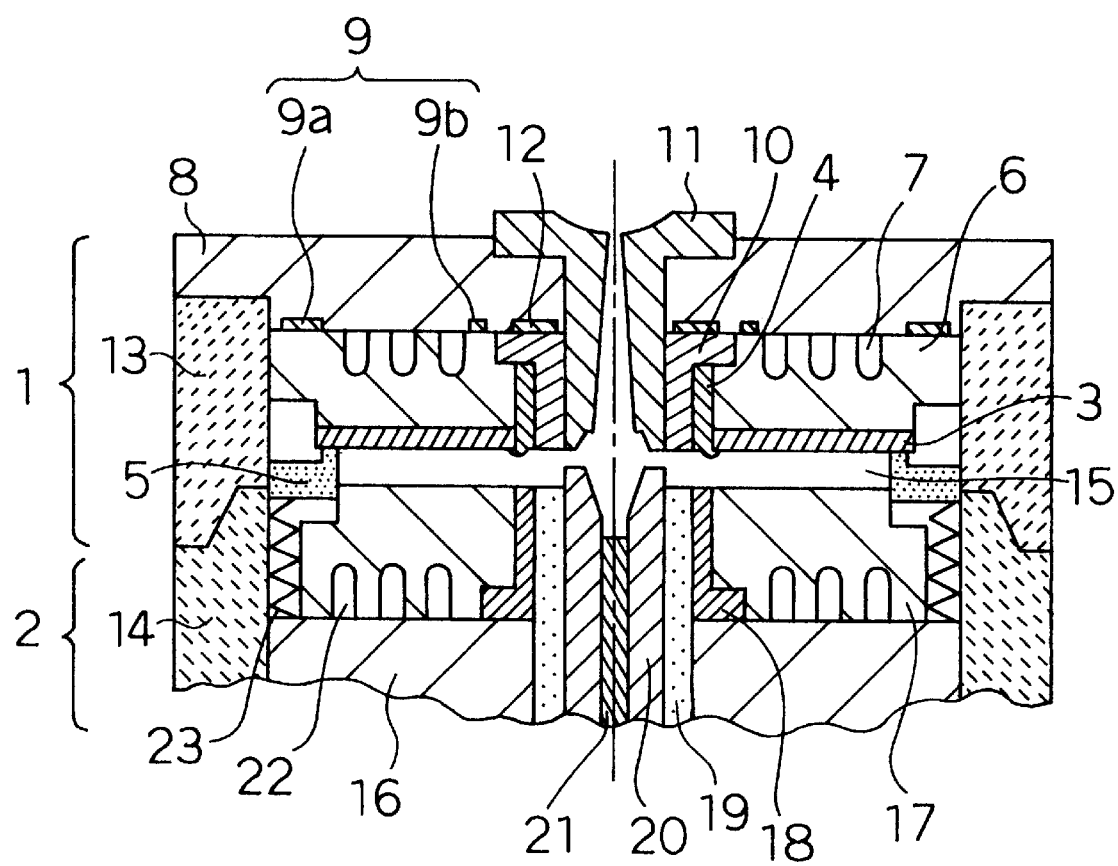
FIG. 1 is a sectional view showing a substrate forming mold in embodiment 1 of the invention.

1 Stable mold
2 Movable mold
3 Stamper
4 Stamper holder
5 Outer ring
6 Fixed mirror finished surface plate
7, 22 Temperature adjusting groove
8 Stable mold base
9, 2, 30, 31 Shim
10 Fixed bush
11 Sprue bush
13 Fixed abutting ring
14 Movable abutting ring
15 Cavity
16 Movable mold base
17 Movable mirror finished surface plate 18 Movable bush
19 Ejector punch
20 Cut punch
21 Ejector pin
23 Spring
24, 28 Cover plate
25, 29 Pin
26 Abutting member
27 Nut
101 Stable mold
102 Movable mold
103 Fixed abutting ring
104 Movable abutting ring
105 Fixed mounting template
106 Shim
107 Fixed mirror finished surface plate
108 Fixed bush
109 Sprue bush
110 Stamper
111 Stamper holder
112 Outer ring
113 Spring
114 Movable mounting template
115 Movable mirror finished surface plate
116 Movable push
117 Ejector punch
118 Cut punch
119 Ejector pin
120, 121 Temperature adjusting groove
401 Junction surface
402, 403 Step

EMBODIMENTS OF THE INVENTION

Embodiments of the invention are described below while referring to FIG. 1 through FIG. 18.

(Embodiment 1)

A sectional view of embodiment 1 of substrate forming mold of the invention is given in FIG. 1.

As shown in FIG. 1, the mold consists of a stable mold 1 which does not slide, and a movable mold 2 which slides.

FIG. 1 shows a case of mounting a stamper 3 at the side of the stable mold 1. The stamper 3 has its inner circumference and outer circumference fixed to a fixed mirror finished surface plate 6 by a stamper holder 4 and an outer ring 5. The fixed mirror finished surface plate 6 has a temperature adjusting groove 7, and the fixed mirror finished surface plate 6 is fastened to the stable mold base 8 with bolts through an O-ring so as to plug the temperature adjusting groove 7.

Shims 9 are disposed on the junction surface of the fixed mirror finished surface plate 6 and stable mold base 8. Inside of the fixed mirror finished surface plate 6, the stamper holder 4, fixed bush 10 and sprue bush 11 are disposed sequentially. The sprue bush 11 has a hole, through which molten resin flows into the mold. On the junction surface of the fixed bush 10 and stable mold base 8, an annular shim 12 for fitting to the sprue bush 11 is provided. One substrate forming member of the invention includes the stamper 3, stamper holder 4, fixed mirror finished surface plate 6, fixed bush 10, etc.

The shims 9 are provided in order to adjust the plate thickness fluctuations in the radial direction and circumferential direction of the formed substrate. On the other hand, a shim 12 is provided for filling in the gap formed between the fixed bush 10 and stable mold base 8 by disposing the shims 9. Therefore, if no gap is formed between the fixed bush 10 and stable mold base 8 by disposing the shims 9, it is not necessary to place the shim 12.

The shims 9 are pinched and pressed between the fixed mirror finished surface plate 6 and fixed substrate base 8, and is hence fixed by frictional force. Herein, when disposing the shims 9, when the shims 9 are coated with heat resistant viscous fluid, such as grease, the shims 9 are fixed temporarily, and moving of the shims 9 are suppressed when joining the fixed mirror finished surface plate 6 and stable mold base 8, so that it is easy to set as specified.

Since the mold is heated to high temperature, the application liquid requires heat resistance. Besides, since the mold is composed of multiple parts, the dimensions between parts vary in the micron order on every occasion of assembling and disassembling. It is hence preferred not to fix the shims 9 with adhesive.

The shim 12 is defined in position by the sprue bush 11, and is hence suppressed in moving.

On the other hand, in the movable mold 2, a movable abutting ring 14 abuts against a fixed abutting ring 13, and a cavity 15 is formed inside the mold. This movable abutting ring 14 is fastened to a movable mold base 16 with bolts. At the inner side of the movable abutting ring 14, a movable mirror finished surface plate 17, a movable bush 18, an ejector punch 19, a cut punch 20, and an ejector pin 21 are disposed sequentially. The cut punch 20 is to form a hole in the inner circumference of the formed substrate, and the ejector punch 19 and ejector pin 21 play the role of extruding the substrate and sprue, respectively. A temperature adjusting groove 22 is also provided in the movable mirror finished surface plate 17. Other substrate forming member of the invention includes the movable mirror finished surface plate 17, movable bush 18, ejector punch 19, etc.

Reference numeral 23 is a spring, which presses the outer ring 5 to the stamper 3 side.

As the shims 9, 12 used in the mold for forming a resin substrate of 15 mm in inner diameter, 120 mm in outer diameter, and 0.6 mm in plate thickness, those 10 mm in width, and varying in thickness from 5 microns, 10 microns, 15 microns, and up to 50 microns at 5-micron increments were prepared, and the following experiment was attempted.

Figure 2:
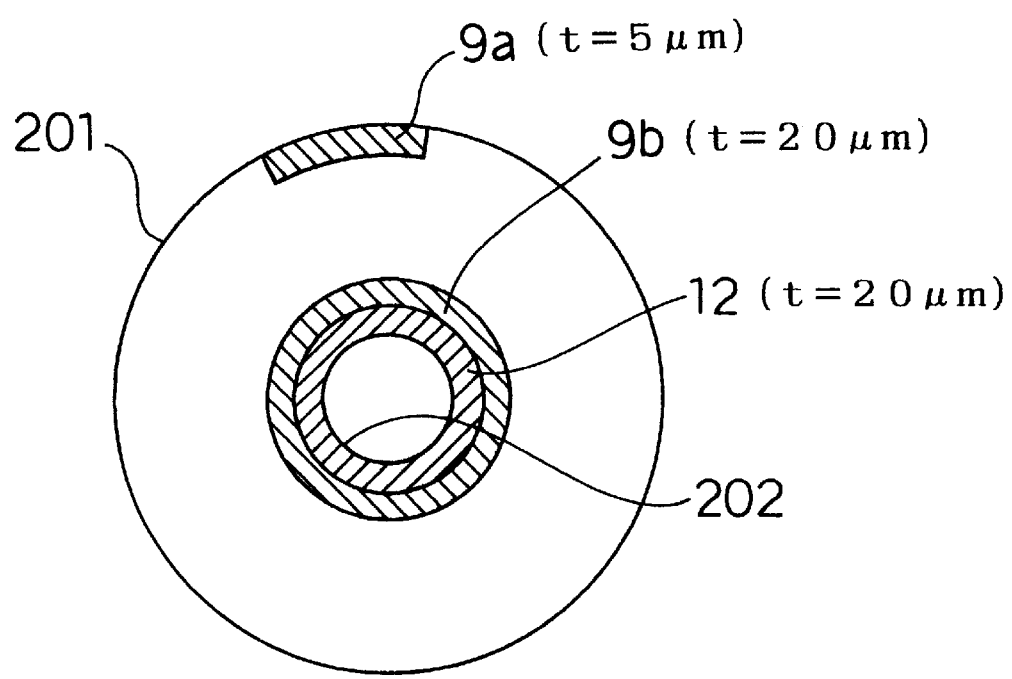
FIG. 2 is a plan view showing configuration of shims of the substrate forming mold in embodiment 1 of the invention.
Figure 3A:
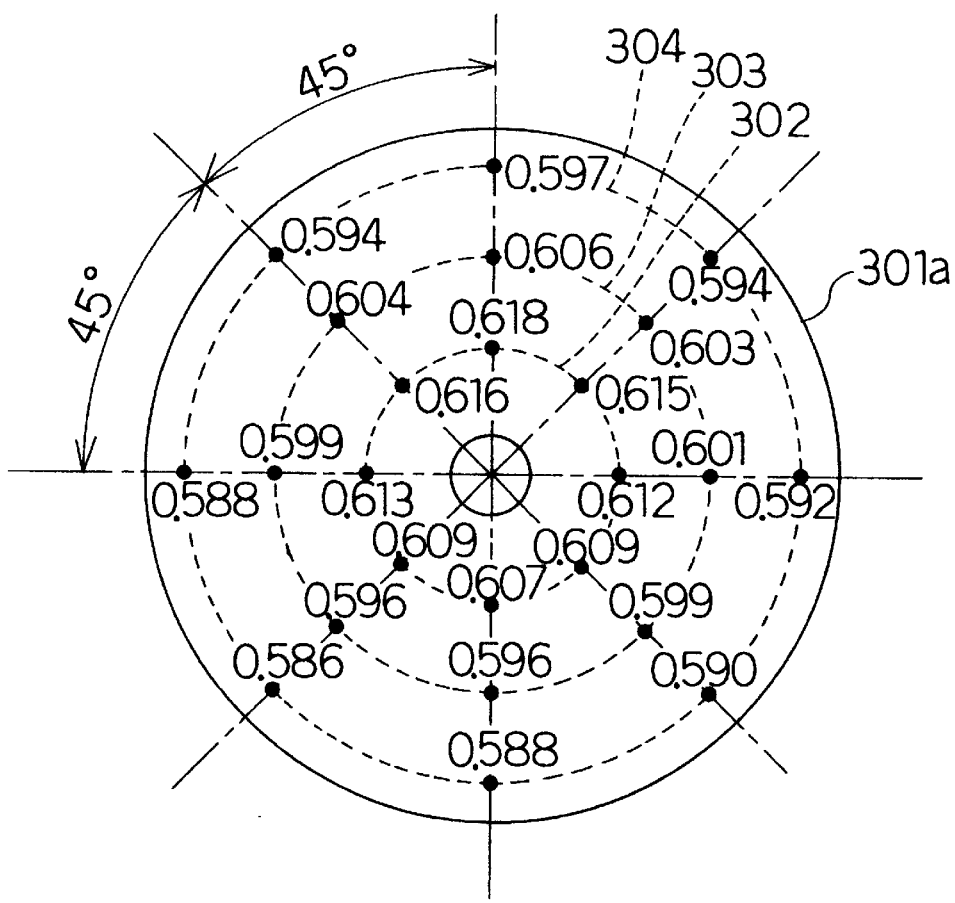
FIG. 3(a) is a plate thickness distribution diagram of the substrate before inserting shims into the substrate forming mold in embodiment 1 of the invention.
Figure 3B:
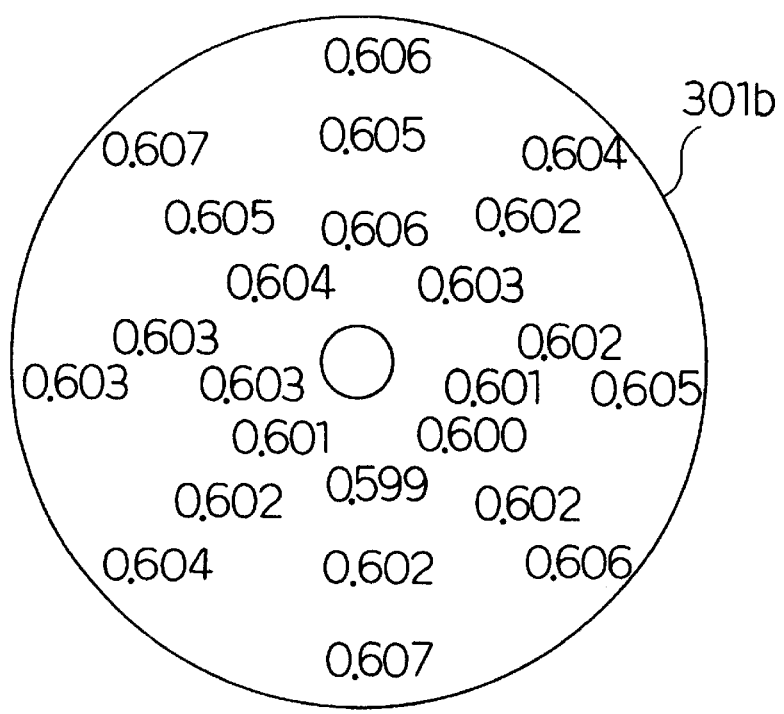
FIG. 3(b) is a plate thickness distribution diagram of the substrate after inserting shims into the substrate forming mold in embodiment 1 of the invention.

FIG. 2 is a plan view showing the shim configuration. FIG. 3(a) shows the plate thickness distribution of a formed substrate 301a formed without inserting shim, and FIG. 3(b) is a diagram showing the plate thickness distribution of a formed substrate 301b formed by inserting shims in the configuration as shown in FIG. 2, and the unit of plate thickness shown in the diagram refers to mm.

In this case, the configuration of shims shown in FIG. 2 is the view of observing the stable mold 1 side from the movable mold 2 side, on the stable mold base 8 at the inside of the fixed abutting ring 13, and the outermost circumferential circle 201 in FIG. 2 corresponds to the outer circumference of the fixed mirror finished surface plate 6 shown in FIG. 1, and the innermost circumferential circle 202 corresponds to the inner edge of the central hole in the fixed bush 10 shown in FIG. 1. The direction of distribution diagram of plate thickness of substrates 301a, 301b shown in FIG. 3(a), FIG. 3(b) corresponds to the direction of the configuration of shims shown in FIG. 2.

The measuring positions of plate thickness of the substrate are, as shown in the diagram, on three concentric circumferential circles with the radius of 23 mm, 40 mm and 58 mm (indicated respectively by reference numerals 302, 303, 304 in the diagram), and the positions of each intersection on eight radial straight lines extending from the center of the substrate at intervals of 45 degrees on the basis of the vertical upward direction of the mold. That is, the plate thickness was measured at 8 positions on each circumferential circle, and in a total of 24 positions. The thickness of the shims was, as shown in FIG. 2, 5 microns, 20 microns and 20 microns in the shims 9a, 9b, 12, sequentially. As the forming condition, the maximum mold clamping pressure was 20 tons, the mold temperature was 125 deg. C, and the cycle was 8 seconds.

As a result, in the case of the conventional constitution without shim, as shown in FIG. 3(a), the maximum plate thickness was 0.618 mm and the minimum plate thickness was 0.586 mm, and the maximum fluctuation of plate thickness in one formed substrate was 32 microns, which was more than 30 microns. By contrast, in the constitution of the embodiment by inserting shims, as shown in FIG. 3(b), the maximum plate thickness was 0.607 mm and the minimum plate thickness was 0.599 mm, and the maximum fluctuation of plate thickness in one formed substrate was 8 microns, so that the fluctuation width was controlled to less than 10 microns.

Herein, the relation between fluctuation distribution of plate thickness and configuration of shims is described while referring to FIG. 2 and FIG. 3(a).

That is, as shown in FIG. 2, the shims 9b of 20 microns in thickness are placed in the center, which is because the plate thickness on the circumference of radius of 23 mm (corresponding to the circumference of dotted line indicated by reference numeral 302 in FIG. 3(a)) without shim is greater by about 20 microns than the plate thickness on the circumference of radius of 58 mm (corresponding to the circumference of dotted line indicated by reference numeral 304 in FIG. 3(a)).

Further as shown in FIG. 2, the shim 9a of 5 microns in thickness is placed on the outer circumference in order to improve the thickness difference of about 10 microns (see FIG. 3(a)) occurring in the circumferential direction in the case without shim. That is, by placing the shim 9a at the indicated position, and inclining the fixed mirror finished surface plate 6 on the whole, fluctuations of plate thickness in the circumferential direction are reduced.

In FIG. 1, the shims 9 are disposed on the inner and outer circumference of the fixed mirror finished surface plate 6, but the shims 9 may be put on any surface without groove 7.

(Embodiment 2)

Figure 4:
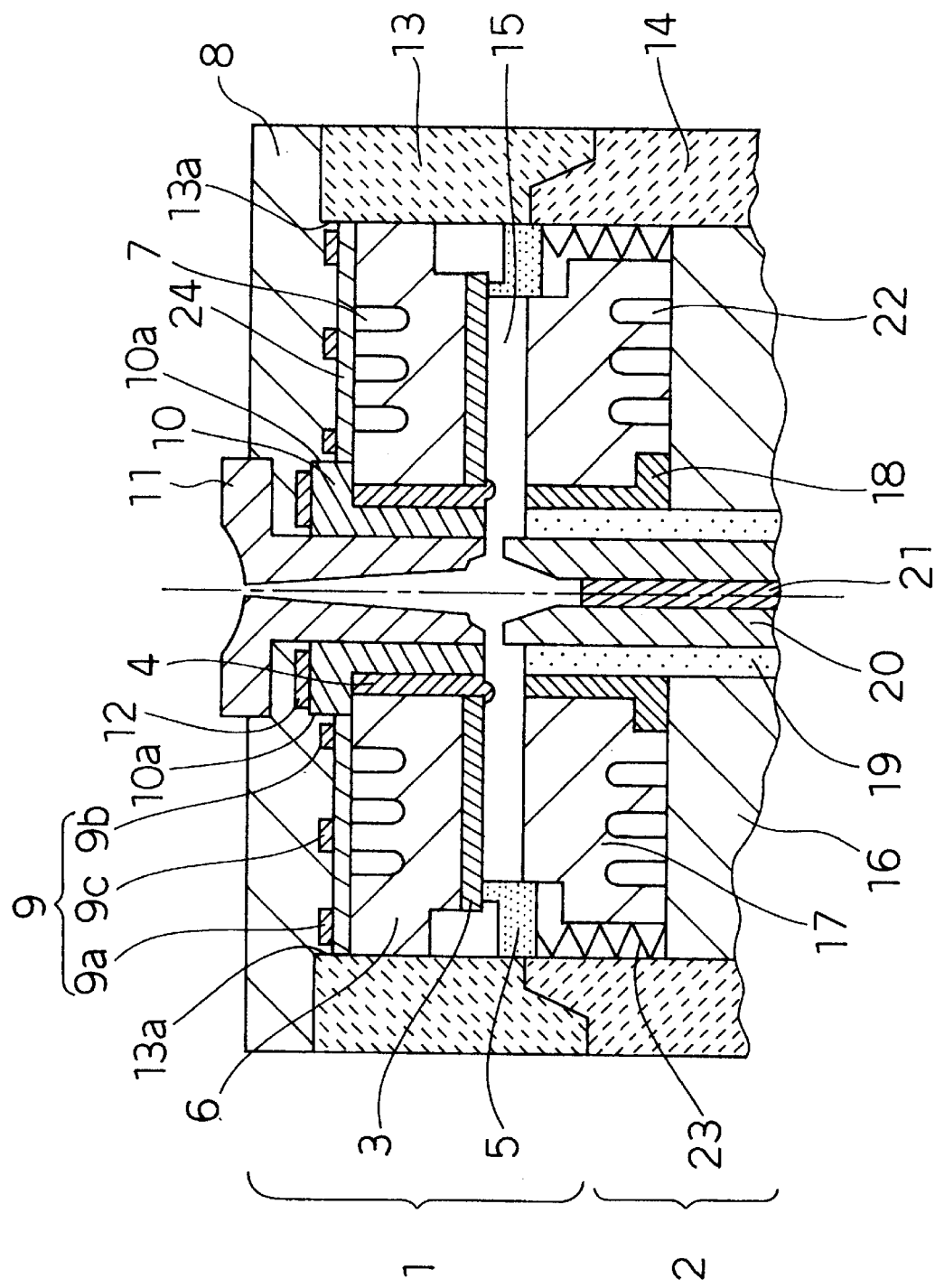
FIG. 4 is a sectional view showing a substrate forming mold in embodiment 2 of the invention.

A sectional view of embodiment 2 of substrate forming mold of the invention is shown in FIG. 4.

What differs from FIG. 1 is, first, that a cover plate 24 for covering the temperature adjusting groove 7 is provided on the fixed mirror finished surface plate 6, so that the fixed mirror finished surface plate 6 is fixed on the stable mold base 8 through the cover plate 24, thereby disposing the shims 9 between the cover plate 24 and the stable mold base 8.

Second, the shim 9a is disposed adjacently to the inner wall 13a of the fixed abutting ring 13, and the shim 9b is disposed adjacently to the outer wall 10a of the fixed bush 10.

By disposing the cover plate 24 between the fixed mirror finished surface plate 6 and stable mold base 8, possibility of leak of fluid flowing in the temperature adjusting groove 7 is eliminated. Besides, the limitation of the position for placing the shims is smaller than in embodiment 1. In addition, by combining the fixed mirror finished surface plate 6 and cover plate 24 integrally by fastening with bolts or other means, it is easier to attach and detach the stable mold base 8 and fixed mirror finished surface plate 6.

Moreover, by fitting an annular member to the end face of the junction surface for disposing the shims 9, possibility of the shims 9 moving to the junction surface of other member is eliminated.

When these shims 9 are coated with, same as in embodiment 1, heat resistant viscous fluid, such as grease, the shims 9 are temporarily fixed, and moving of the shims 9 are suppressed when joining the cover plate 24 and stable mold base 8, so that it is easier to set as specified.

The shim 12 is annular same as in embodiment 1. The shim 12 is defined by the sprue bush 11, and is suppressed in moving.

As the shims 9, 12 used in the mold for forming a resin substrate of 15 mm in inner diameter, 120 mm in outer diameter, and 0.6 mm in plate thickness, those 5 mm in width, and varying in thickness from 5 microns, 10 microns, 15 microns, and up to 50 microns at 5-micron increments were prepared, and the following experiment was attempted.

Figure 5:
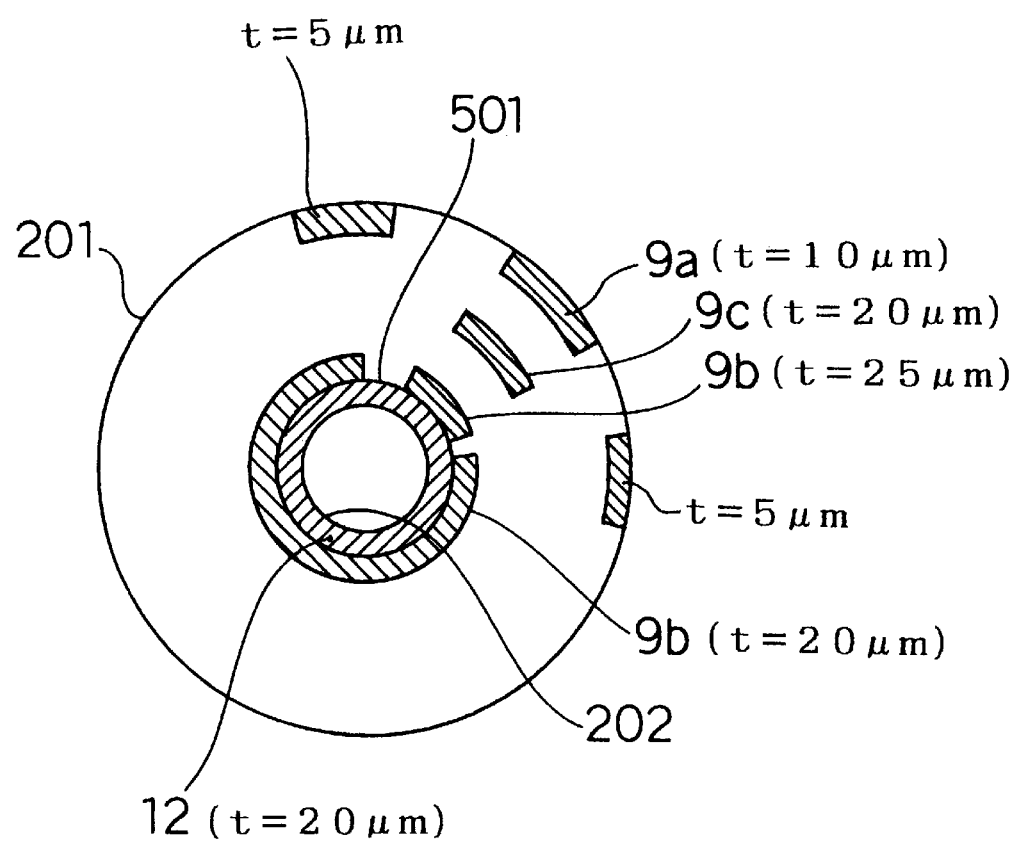
FIG. 5 is a plan view showing configuration of shims of the substrate forming mold in embodiment 2 of the invention.
Figure 6:
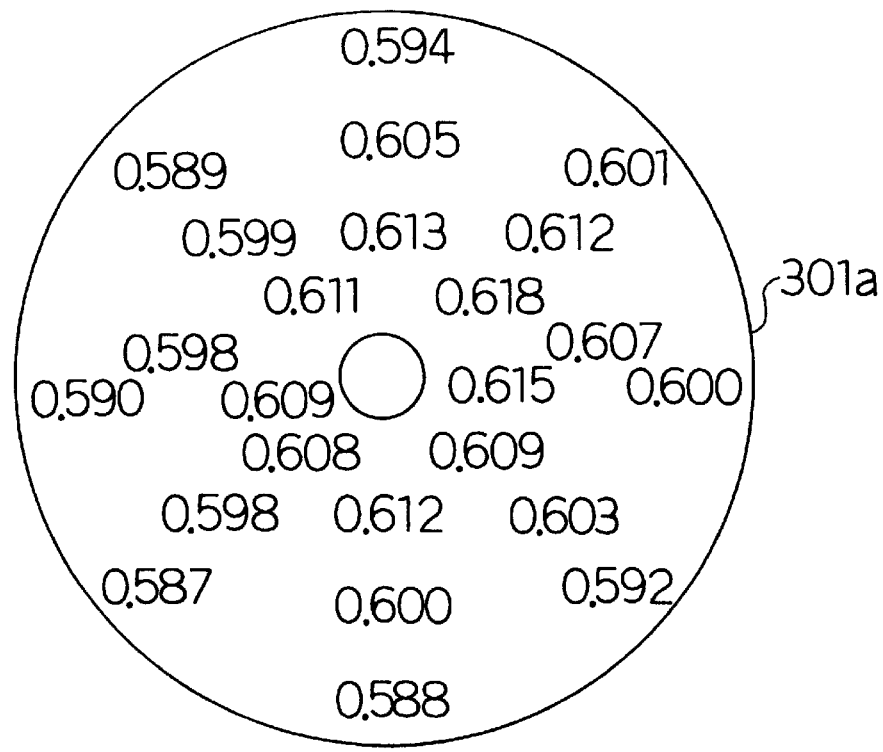
FIG. 6(a) is a plate thickness distribution diagram of the substrate before inserting shims into the substrate forming mold in embodiment 2 of the invention.
FIG. 6(b) is a plate thickness distribution diagram of the substrate after inserting shims into the substrate forming mold in embodiment 2 of the invention.
Figure 6:
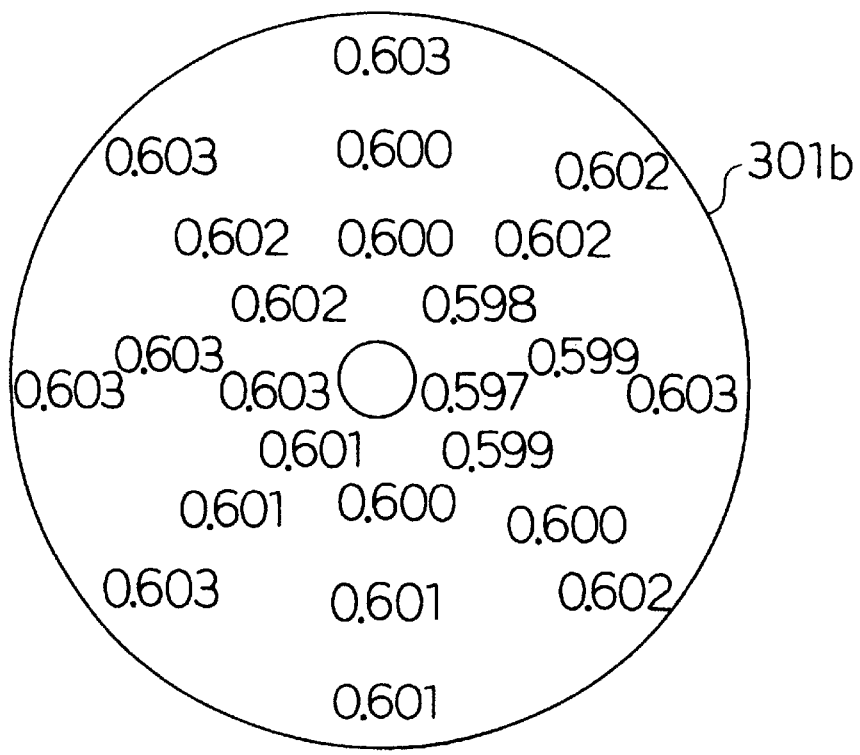

FIG. 5 is a diagram showing the shim configuration. FIG. 6(a) shows the plate thickness distribution of a formed substrate 301a formed without inserting shim, and FIG. 6(b) is a diagram showing the plate thickness distribution of a formed substrate 301b formed by inserting shims in the configuration as shown in FIG. 5, and the unit of plate thickness shown in the diagram refers to mm.

In this case, the configuration of shims shown in FIG. 5 is the view of observing the stable mold 1 side from the movable mold 2 side, on the stable mold base 8 at the inside of the fixed abutting ring 13, and the outermost circumferential circle 201 in FIG. 5 corresponds to the outer circumference of the fixed mirror finished surface plate 6 shown in FIG. 4, and the innermost circumferential circle 202 corresponds to the inner edge of the central hole in the fixed bush 10 shown in FIG. 4. In FIG. 5, a circumferential circle 501 corresponds to the outer circumference 10a of the fixed bush 10 shown in FIG. 4. The direction of distribution diagram of plate thickness of substrates 301a, 301b shown in FIG. 6(a), FIG. 6(b) corresponds to the direction of the configuration of shims shown in FIG. 5.

The measuring positions of plate thickness of the substrate are same as explained in FIG. 3(a). The thickness of shims is as shown in FIG. 5. The forming conditions are same as specified in FIG. 3(a) and FIG. 3(b).

As a result, in the case of the conventional constitution without shim, as shown in FIG. 6(a), the maximum plate thickness was 0.618 mm and the minimum plate thickness was 0.587 mm, and the maximum fluctuation of plate thickness in one formed substrate was 31 microns. By contrast, in the constitution of the embodiment by inserting shims, as shown in FIG. 6(b), the maximum plate thickness was 0.603 mm and the minimum plate thickness was 0.597 mm, and the maximum fluctuation of plate thickness in one formed substrate was 6 microns, so that the fluctuation width was controlled to less than 10 microns.

Herein, the relation between fluctuation distribution of plate thickness and configuration of shims is described while referring to FIG. 5 and FIG. 6(a).

In the plate thickness distribution without shim, as shown in FIG. 6(a), in the radial direction, the plate thickness on the circumference of radius of 23 mm was more than 20 microns larger than the plate thickness on the circumference of radius of 58 mm. When the shims 9b of 20 microns in thickness are placed, subtracting 0.610 mm, 0.600 mm, and 0.590 mm from the plate thickness values on the circumference of radius of 23 m, 40 mm, and 58 mm, it is known, in the circumferential direction, that the plate thickness is greater by more than 10 microns in the upper right position on the substrate 301a (see FIG. 6(a)).

Accordingly, the shims 9a and shims 9b were placed in the positions shown in FIG. 5. On the circumference of radius of 40 mm in the upper right position on the substrate 301a, a slight bulging is noted. Accordingly, by placing the shims 9c in the position shown in FIG. 5, this bulging was corrected.

Herein, annular shims 12 were used, but different shapes may be used. In this case, the inner side and outer side of the shim 12 are defined by the sprue bush 11 and stable mold base 8, respectively.

(Embodiment 3)

Figure 7:
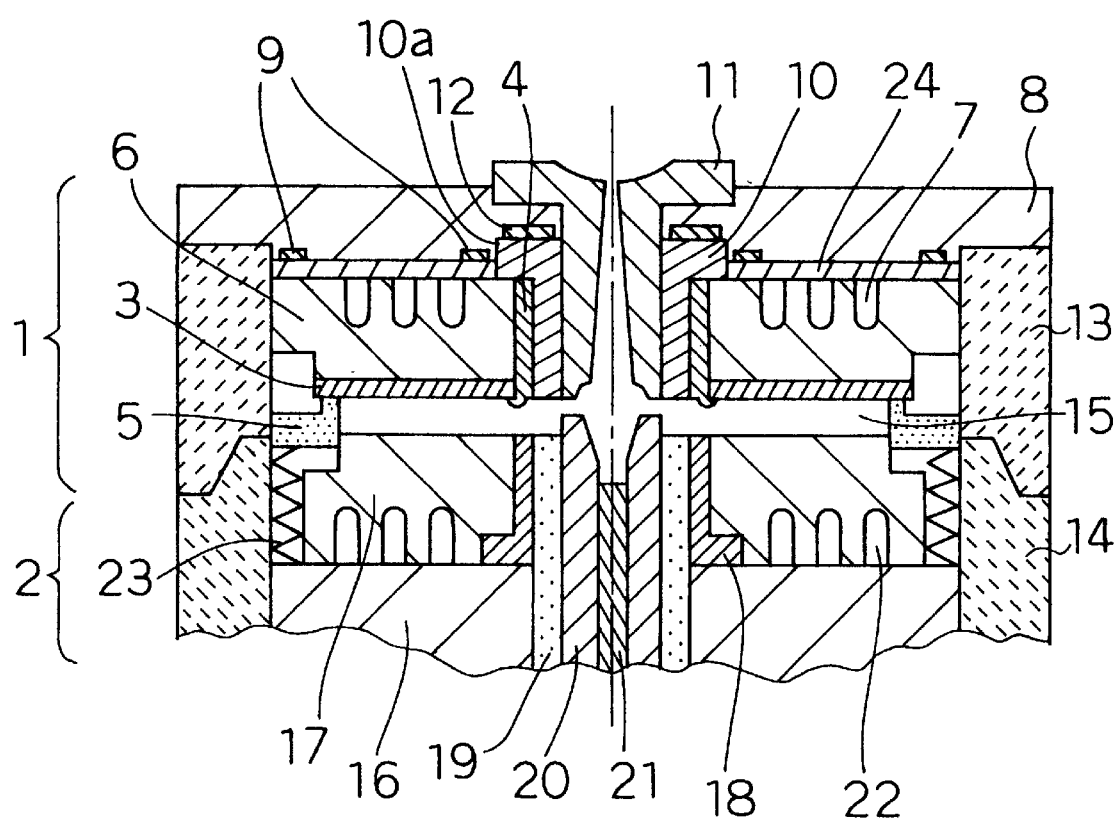
FIG. 7 is a sectional view showing a substrate forming mold in embodiment 3 of the invention.
Figure 8A:
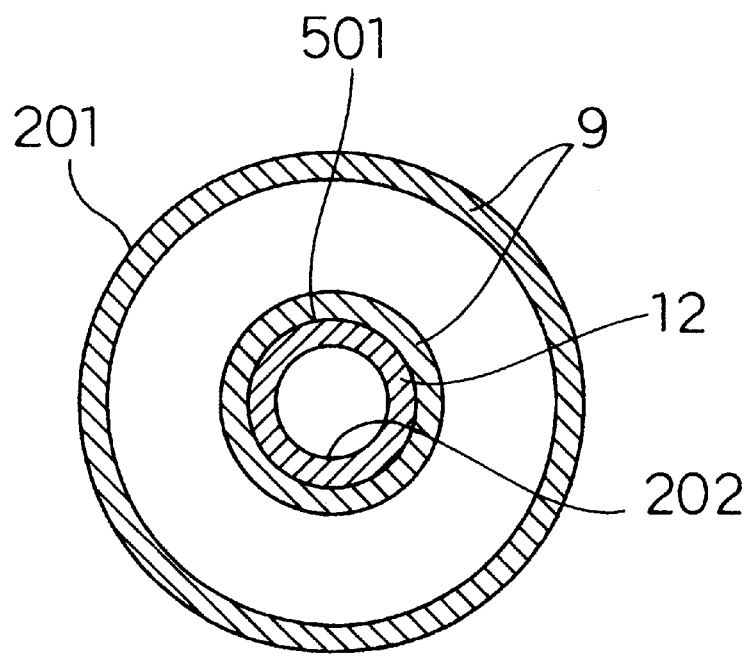
FIG. 8(a) is a plan view showing configuration of shims of the substrate forming mold in embodiment 3 of the invention.

A sectional view of embodiment 3 of substrate forming mold of the invention is shown in FIG. 7. FIG. 8(a) is a plan view showing a configuration of shims. The configuration of shims in FIG. 8(a) is the view of observing the stable mold 1 side from the movable mold 2 side, on the stable mold base 8 at the inside of the fixed abutting ring 13, while in FIG. 8(a), the outermost circumferential circle 201 corresponds to the outer circumference of the fixed mirror finished surface plate 6 shown in FIG. 7, and the innermost circumferential circle 202 corresponds to the inner edge of the central hole in the fixed bush 10 shown in FIG. 7. In FIG. 8(a), a circumferential circle 501 corresponds to the outer circumference 10a of the fixed bush 10 shown in FIG. 7.

What differs from embodiment 2 is that the shims 9 are annular, and same as in embodiment 2, it is disposed adjacently to the annular member at the end of the junction surface. The specific annular member is a fixed bush 10 at the inner side, and a fixed abutting ring 13 at the outer side. As a result, moving of the shims 9 are suppressed.

Figure 8B:
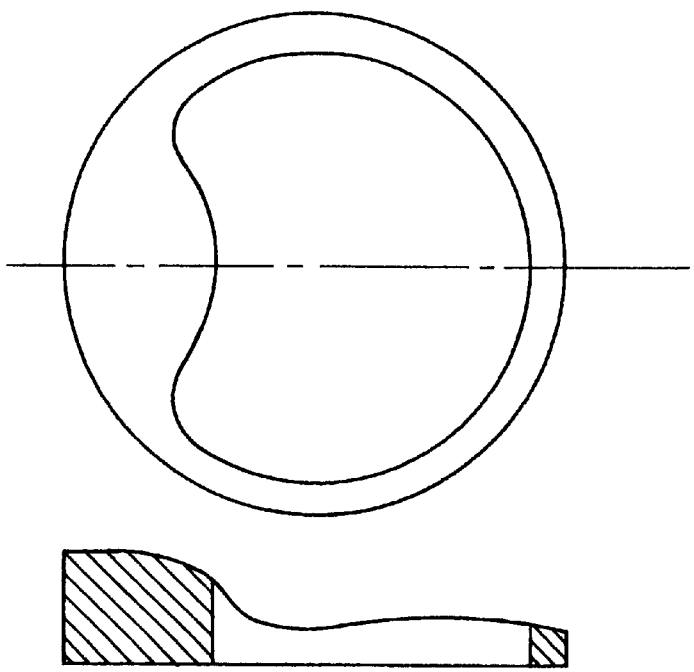
FIG. 8(b) is a plan view and sectional view showing the shape of shims of the substrate forming mold in embodiment 3 of the invention.

The shims 9 are adjusted of its thickness by the inner circumference and outer circumference, and fluctuation of formed substrate is suppressed. Herein, as other example of annular shim 9, as shown in FIG. 8(b), a shape differing in thickness depending on the position within the annular profile may be used. FIG. 8(b) shows a plan and a sectional view of an annular shim differing in thickness depending on position in the annular profile.

The shim 12 is also annular and is defined in position by the sprue bush 11, and is suppressed in moving.

As the shims 9, 12 used in the mold for forming a resin substrate of 15 mm in inner diameter, 120 mm in outer diameter, and 0.6 mm in plate thickness, those 10 mm in width, and varying in thickness from 5 microns, 10 microns, 15 microns, and up to 50 microns at 5-micron increments were prepared, and the following experiment was attempted. The forming conditions are same as in the foregoing embodiments.

As a result, in the case of the conventional constitution without shim, the maximum fluctuation of plate thickness in one formed substrate was 30 microns or more, whereas in the constitution of the embodiment with shims, the maximum fluctuation width was controlled to less than 15 microns.

Also, with shims shown in FIG. 8(b), the maximum fluctuation width was controlled to less than 10 microns.

Herein, annular shim 12 was used, but different shape may be used.

Incidentally, in FIG. 8(a), two shims 9 of different diameter are inserted, but only one may be used depending on the situation of distribution of fluctuations.

(Embodiment 4)

Figure 9:
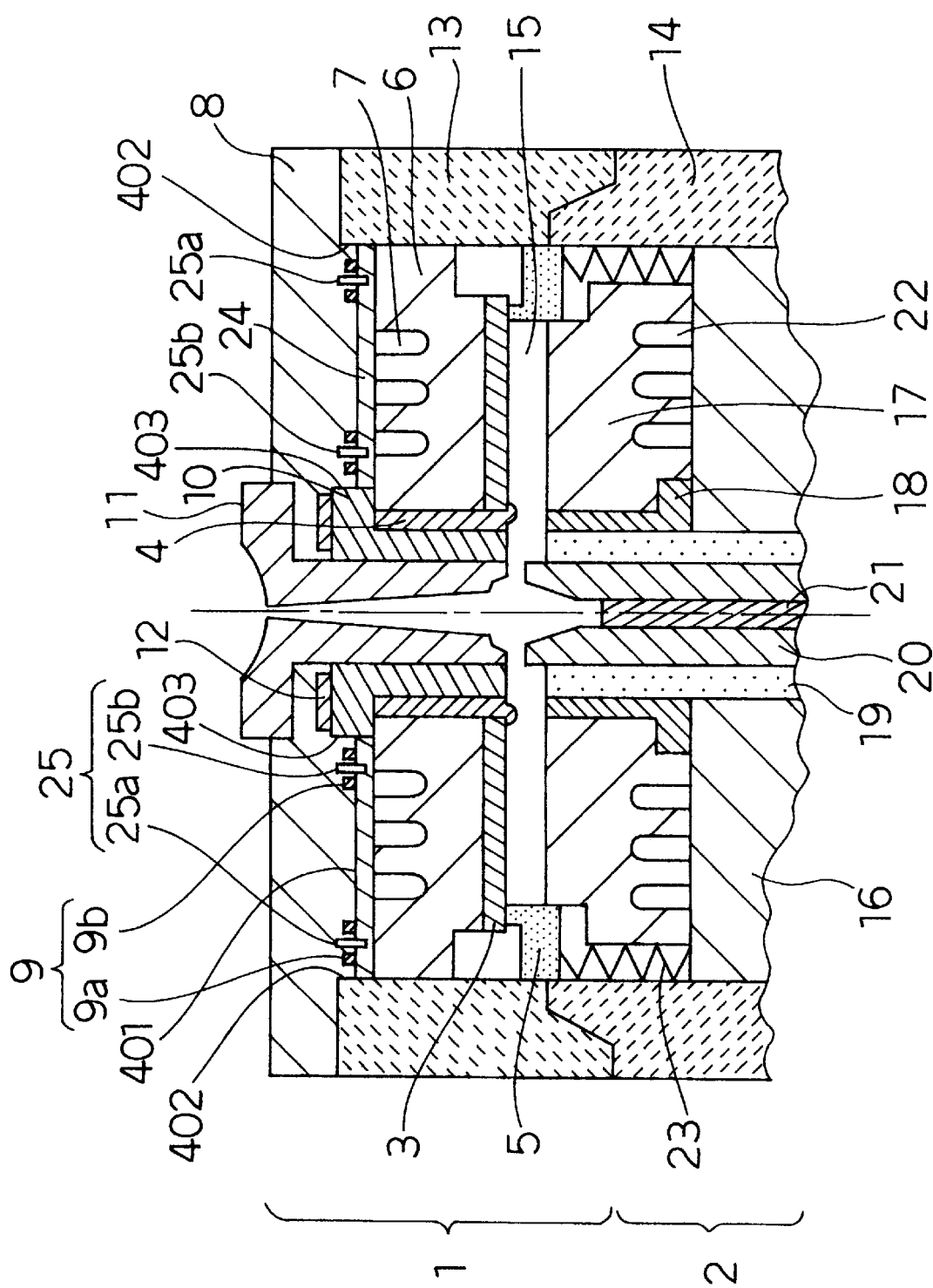
FIG. 9 is a sectional view showing a substrate forming mold in embodiment 4 of the invention.
Figure 10:
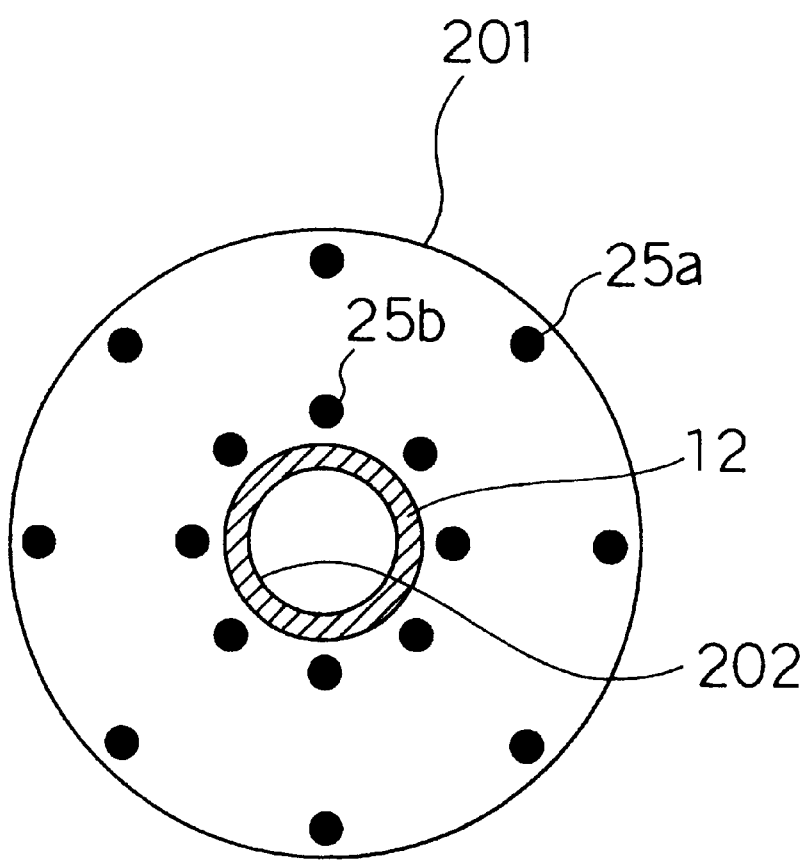
FIG. 10 is a plan view showing configuration of shims and pins of the substrate forming mold in embodiment 4 of the invention.
Figure 11:
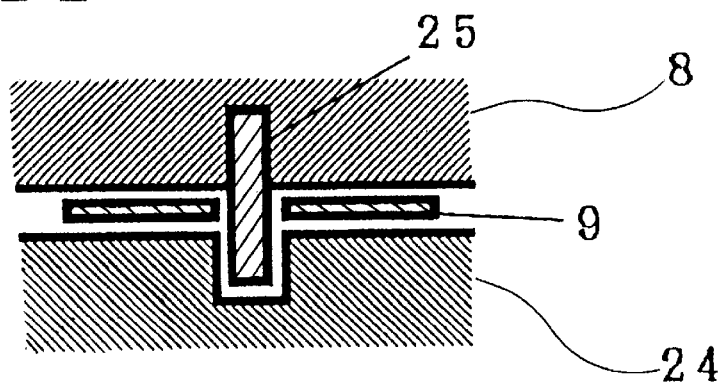
FIG. 11(a) is a sectional view showing constitution of shims and pins of the substrate forming mold in embodiment 4 of the invention.
FIG. 11(b) to FIG. 11(f) are plan views showing the shim shape of the substrate forming mold in embodiment 4 of the invention.
Figure 11:
Figure 11:
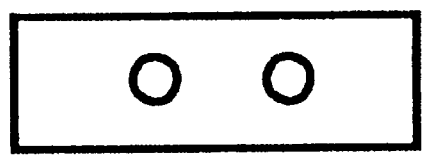
Figure 11:
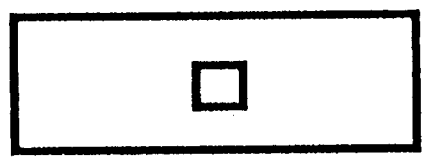
Figure 11:
Figure 11:

A sectional view of embodiment 4 of substrate forming mold of the invention is shown in FIG. 9. FIG. 10 is a plan view showing a configuration of shim 12 and pins 25a, 25b. In this case, the configuration of shim 12 and pins 25 in FIG. 10 is the view of observing the stable mold 1 side from the movable mold 2 side, on the stable mold base 8 at the inside of the fixed abutting ring 13, and in FIG. 10, the outermost circumferential circle 201 corresponds to the outer circumference of the fixed mirror finished surface plate 6 shown in FIG. 9, and the innermost circumferential circle 202 corresponds to the inner edge of the central hole in the fixed bush 10 shown in FIG. 9.

What differs from FIG. 4 is that plural convex and concave fitting portions are provided in the member for forming the junction surface for putting shims 9 on while shims 9 are provided with holes to be engaged with convex portions. In FIG. 9, as shown in FIG. 11(a), pins 25 are inserted into the stable mold base 8, and concave parts for inserting pins 25 are formed at the positions corresponding to the pins 25 in the cover plate 24. After fitting the shims 9 having holes into the pins 25, the shims 9 are pressed by the fixed mirror finished surface plate 6 and stable mold base 8. As a result, moving of the shim 9 is suppressed.

The shim 12 is annular. Therefore the shim 12 is defined by the sprue bush 11 to be fitted with, and is suppressed in moving.

The sectional shape of pins 25 and shape of holes in shims 9 are shown in FIG. 11(b) through FIG. 11(f). As shown in FIG. 25(b), when fixing one shim 9 by one circular pin 25, a rotating motion around the pin is considered. Accordingly, when plural pins 25 are passed in the shim 9 as shown in FIG. 11(c), such rotating motion can be suppressed.

Incidentally, if one pin 25 is pas sed in one shim 9, the rotating motion of the shim 9 can be suppressed as far as the sectional shape of the pin 25 and hole shape of the shim are other than true roundness. The sectional shape of the pin 25 and hole shape of the shim 9 should be, for example, polygonal, and preferably square or triangular as shown in FIG. 11(d) and (e), or elliptical as shown in FIG. 11(f).

If the number of pins passing through one shim is only one, the rotating motion of the shim 9 can be suppressed when the shim 9 is disposed adjacently to the annular member fitting with the end face of the junction surface.

For example, as shown in FIG. 9, a step 402 is formed at the position of the junction surface 401 of the cover plate 24 and stable mold base 8 contacting with the inner wall of the fixed abutting ring 13. The configuration of the shim 9a and the pin 25a to be inserted into the shim 9a should be arranged so that the end face of the shim 9a may be adjacent to the inner circumference of this step 402. Similarly, a step 403 is formed at the position of the junction surface 401 contacting with the outer wall of the fixed bush 10. The configuration of the shim 9b and the pin 25b to be inserted into the shim 9b should be arranged so that the end face of the shim 9b may be adjacent to the outer circumference of this step 403.

In any of the constitutions above, as the shims 9, 12 used in the mold for forming a resin substrate of 15 mm in inner diameter, 120 mm in outer diameter, and 0.6 mm in plate thickness, those 10 mm in width, and varying in thickness from 5 microns, 10 microns, 15 microns, and up to 50 microns at 5-micron increments were prepared, and the following experiment was attempted. The forming conditions are same as in the foregoing embodiments, that is, the maximum mold clamping pressure was 20 tons, the mold temperature was 125 deg. C, and the cycle was 8 seconds.

As a result, fluctuations of plate thickness in one formed substrate were 30 microns or more in the conventional constitution, but were less than 10 microns in embodiment 4 of the invention. Besides, by dismounting the mold periodically, moving of shims 9 and a shim 12 was investigated, but moving of shims 9 and a shim 12 was not observed.

In embodiment 4, pins 25 are provided at the stable mold base 8 side, and concave parts for inserting the pins 25 are provided at the cover plate 24 side, but, reversely, the pins 25 may be disposed at the cover plate 24 side.

Holes may be also formed in the shims 12 as well as in the shims 9, and pins may be inserted in the holes.

As the convex parts to fit the shims, instead of pins fitted into the members, mold members may be directly processed.

(Embodiment 5)

Figure 12:
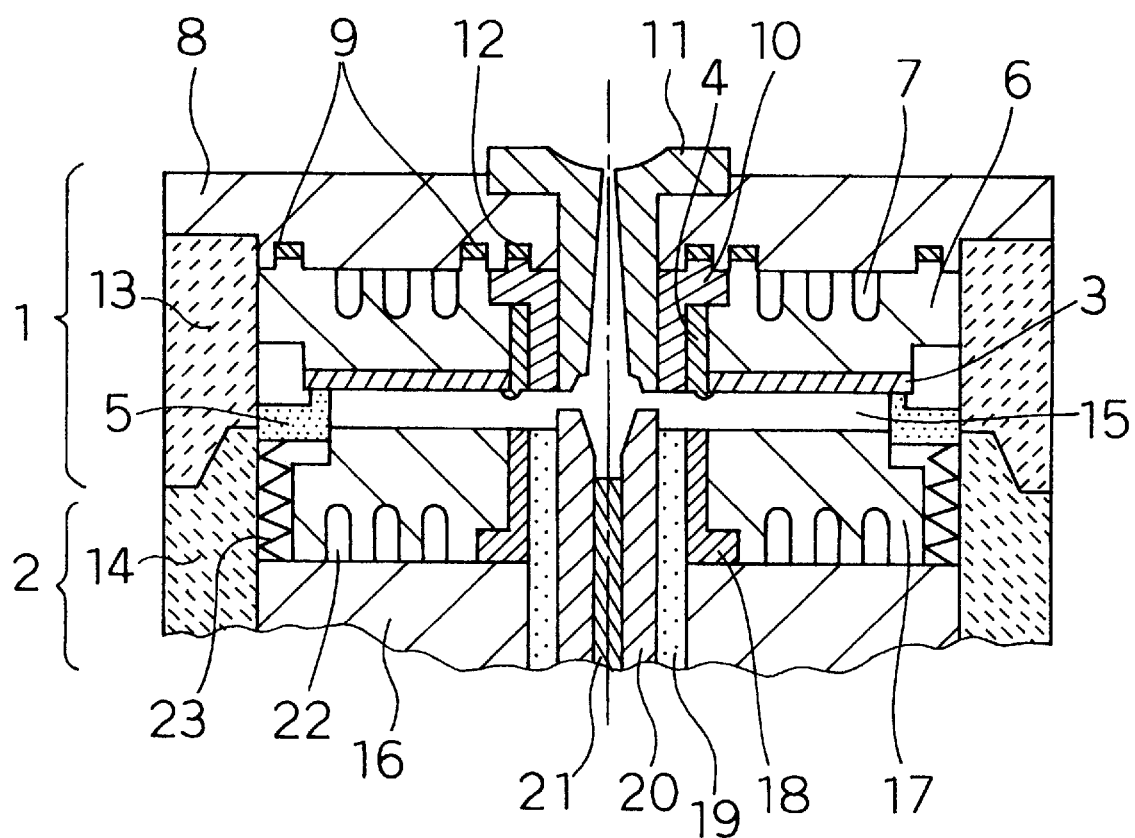
FIG. 12 is a sectional view showing a substrate forming mold in embodiment 5 of the invention.

A sectional view of embodiment 5 of substrate forming mold of the invention is shown in FIG. 12

In the constitution shown in FIG. 12, different from the constitution in FIG. 1, a convex part is formed in the fixed mirror finished surface plate 6, and a concave part fitting therewith is provided in the stable mold base 8, and a shim 9 is provided between the flat contacting planes of the convex and concave fitting parts.

Similarly, a convex part is formed in the fixed bush, a concave part fitting therewith is provided in the stable mold base 8, and a shim 12 is provided between the flat contacting planes of the convex and concave fitting parts.

The each shape of the shim 9 and shim 12 and the shape of the bottom part of the concave part are the same, and since they are engaged with the bottom part each other, moving is suppressed.

Positions of convex and concave parts may be scattered about on the junction surface, and preferably they should be scattered uniformly, or concentrically with cavity 15. For concentric disposition, the convex and concave parts should be provided at least on the inner circumference and outer circumference of the junction surface. That is, by adjusting the thickness of the shims 9 provided on the inner circumference and outer circumference, fluctuations in the radial direction of the formed substrate can be suppressed. Also by adjusting the thickness of the plural shims 9 provided in the peripheral direction, fluctuations in the peripheral direction of the formed substrate can be suppressed.

Figure 13:
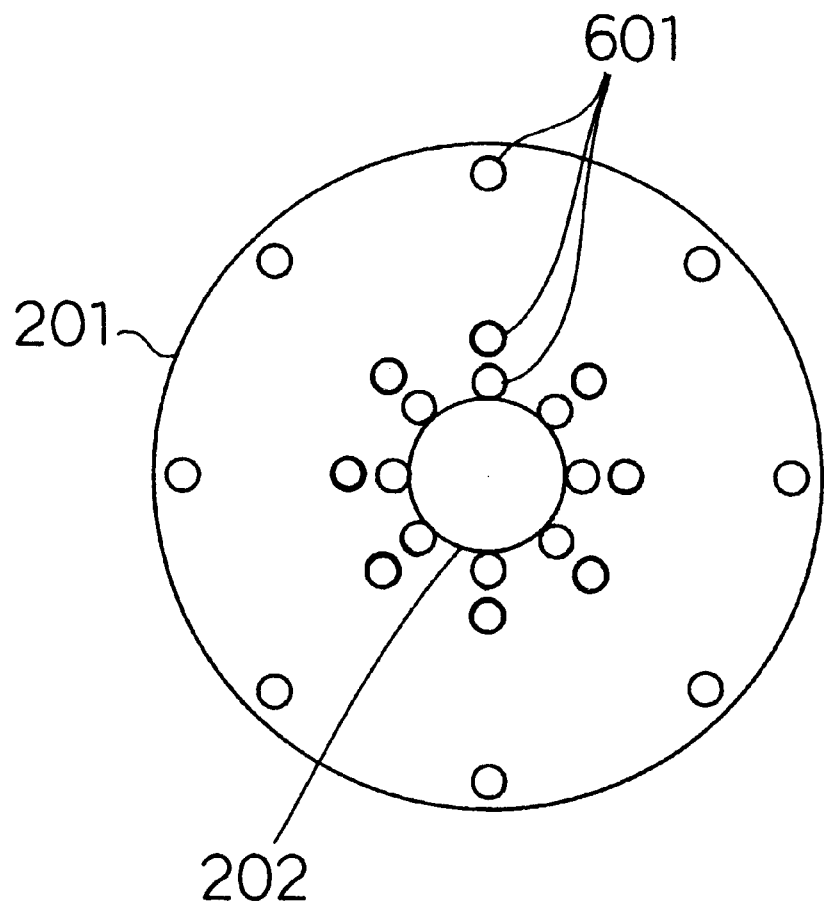
FIG. 13 is a sectional view of concave parts for disposing shims of the substrate forming mold in embodiment 5 of the invention.

FIG. 13 is a plan view showing the configuration of concave parts 601 for inserting the shims 9 or 12. In this case, the configuration of the concave parts 601 shown in FIG. 13 is the view of observing the stable mold 1 side from the movable mold 2 side, on the stable mold base 8 at the inside of the fixed abutting ring 13. In FIG. 13, the outermost circumferential circle 201 corresponds to the outer circumference of the fixed mirror finished surface plate 6 shown in FIG. 12, and the innermost circumferential circle 202 corresponds to the inner edge of the central hole in the fixed bush 10 shown in FIG. 12.

Herein, the outline of the shims and the sectional shape of concave parts are circular. The diameter of the concave part is 10 mm, and the diameter of the shim is 9 mm.

As the shims 9, 12 used in the mold for forming a resin substrate of 15 mm in inner diameter, 120 mm in outer diameter, and 0.6 mm in plate thickness, those varying in thickness from 5 microns to 50 microns at 5-micron increments were prepared, and the experiment was conducted same as in the preceding embodiments. The forming conditions are same as in the foregoing embodiments.

As a result, in the conventional constitution without shims, the maximum fluctuation of plate thickness in one formed substrate was 30 microns or more, but in the constitution of the embodiment inserting the shims, the maximum fluctuation width was controlled to less than 10 microns.

In this embodiment, the outline of the shims is circular, but not limited to this, the outline of the shims is not particularly limited as far as possible to be fitted into the concave part. The sectional shape of the concave part is not limited to circular form.

(Embodiment 6)

Figure 14:
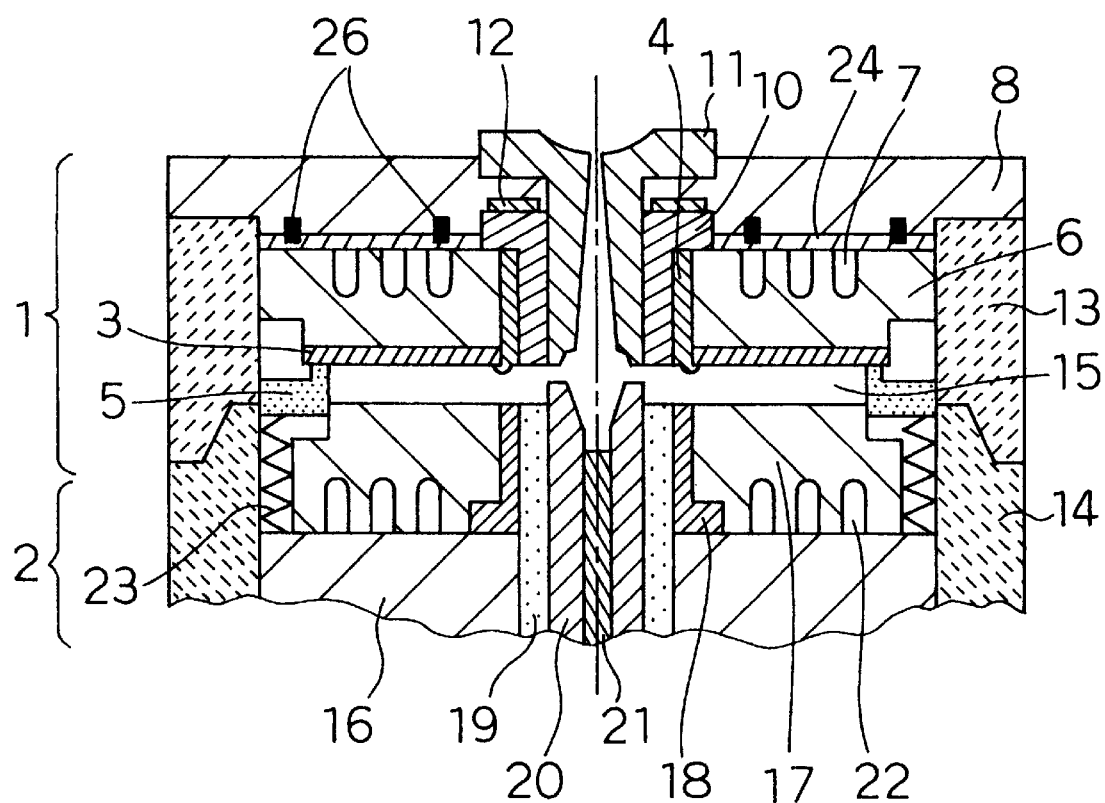
FIG. 14 is a sectional view showing a substrate forming mold in embodiment 6 of the invention.

A sectional view of embodiment 6 of substrate forming mold of the invention is shown in FIG. 14.

Figure 16A:
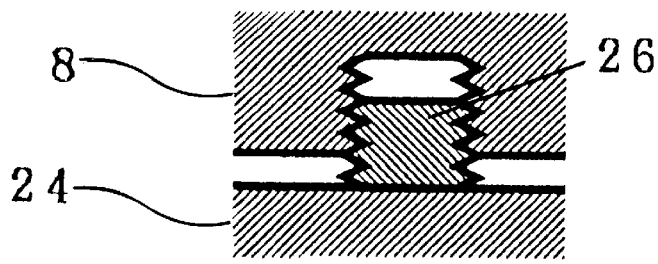
FIG. 16(a) is a sectional view showing constitution of abutting members of the substrate forming mold in embodiment 6 of the invention.
Figure 16B:
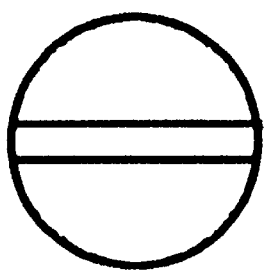
FIG. 16(b) to FIG. 16(e) are plan views showing the groove shape of the head of the abutting member of the substrate forming mold in embodiment 6 of the invention.
Figure 16C:
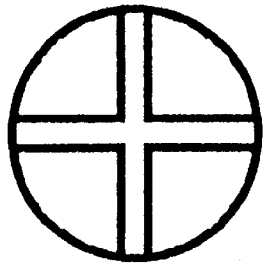
Figure 16D:
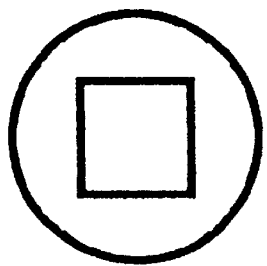
Figure 16E:
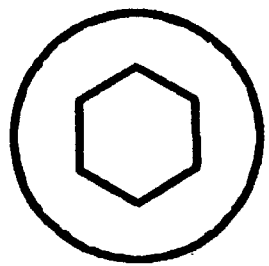

In the constitution shown in FIG. 14, instead of the shims 9 shown in FIG. 4, abutting members 26 are provided on the junction surface of the cover plate 24 and stable mold base 8. In detail, as shown in FIG. 16(a), this abutting member 26 corresponding to the protruding member of the invention has threads cut on the periphery, and is screwed into the concave part having threads on the side provided on the stable mold base 8. Herein, by rotating the abutting member 26, the projecting amount from the stable mold base 8 can be adjusted. The protruding amount of the invention corresponds to this projecting amount.

More specifically, supposing the diameter of the abutting member 26 to be 10 mm and the thread pitch to be 0.5 mm, to adjust the projecting amount by 10 microns, 1/50 of a revolution is turned. Accordingly, to adjust the projecting amount, as shown in FIG. 17(a) and FIG. 17(b), using gears differing in ratio of rotation, for example, a tool for turning the abutting member 26 by one revolution by turning the adjusting side 10 times may be used.

FIG. 17(a) is a sectional view of AA of FIG. 17(b). Reference numerals 702 to 704 shown in FIG. 17(a) are gears differing in the ratio of rotation. The leading end 701 shown in FIG. 17(b) is the abutting member 26 side.

There is a groove in the head of the abutting member 26, and the leading end 701 of the tool shown in FIG. 17(b) is fitted into this groove so as to be easy to rotate. The shape of the groove may be any other than true roundness, and may include, for example, slot, cross, square, and hexagon as shown in FIG. 16(b) to (e).

The abutting members 26 may be scattered about on the junction surface of the cover plate 24 and stable mold base 8, and preferably they should be scattered uniformly, or concentrically with cavity 15. That is, by adjusting the projecting amount of the plural abutting members 26 provided in the peripheral direction, fluctuations in the peripheral direction of the formed substrate can be suppressed. For concentric disposition of the abutting members 26, they should be provided at least on the inner circumference and outer circumference of the junction surface. This is because by adjusting the projecting amount of the abutting members 26 provided on the inner circumference and outer circumference, fluctuations in the radial direction of the formed substrate can be suppressed.

Figure 15:
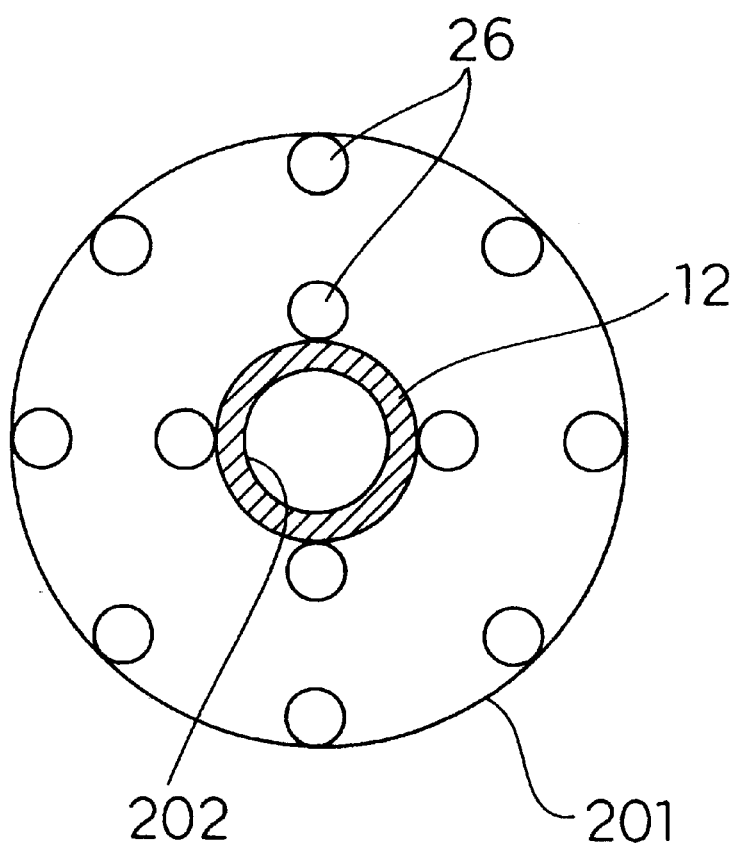
FIG. 15 is a plan view showing configuration of abutting members of the substrate forming mold in embodiment 6 of the invention.

FIG. 15 is a plan view showing an example of configuration of convex and concave parts. In this case, the configuration of the convex and concave parts (abutting members 26) shown in FIG. 15 is the view of observing the stable mold 1 side from the movable mold 2 side, on the stable mold base 8 at the inside of the fixed abutting ring 13.

The shim 12 is annular, and its inner circumference and outer circumference are defined by the sprue bush 11 and stable mold base 8.

As the shims 12 used in the mold for forming a resin substrate of 15 mm in inner diameter, 120 mm in outer diameter, and 0.6 mm in plate thickness, those varying in thickness from 5 microns to 50 microns at 5-micron increments were prepared, and by varying the projecting amount of the abutting members 26, the experiment was conducted same as in the preceding embodiments. The forming conditions are same as in the foregoing embodiments.

As a result, in the conventional constitution, the maximum fluctuation of plate thickness in one formed substrate was 30 microns or more, but in the constitution of the embodiment using the abutting members 26, the maximum fluctuation width was controlled to less than 10 microns.

Since the abutting members 26 are screwed and fixed in the stable mold base 8, they do not move in the lateral direction. However, possibility of rotation is involved. Accordingly, threads must be coated with adhesive or the like to prevent rotation.

Figure 16F:
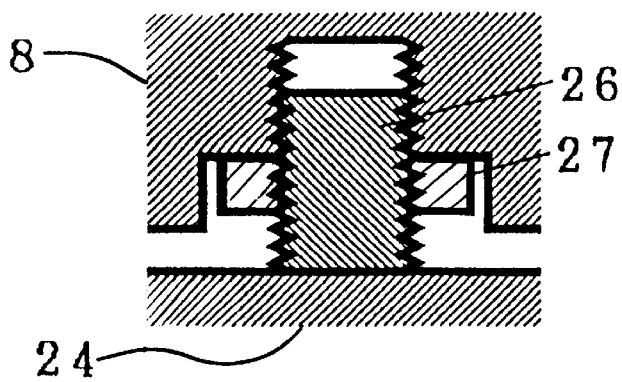
FIG. 16(f) is a sectional view showing configuration of the abutting member of the substrate forming mold in embodiment 6 of the invention.
Figure 16G:
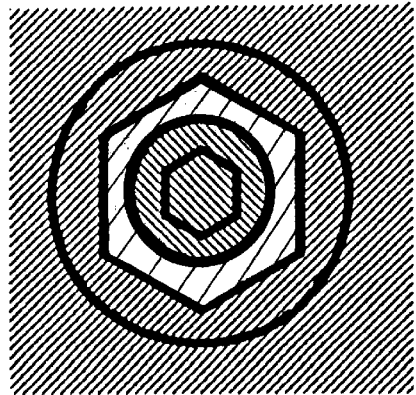
FIG. 16(g) is a plan view showing constitution of the abutting member of the substrate forming mold in embodiment 6 of the invention.
Figure 17:
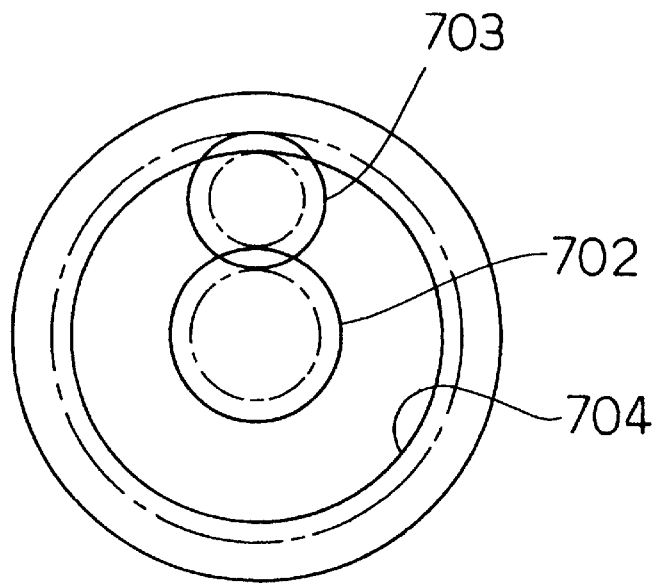
FIG. 17(a) is a sectional view of jig for adjusting the projecting amount of the abutting member of the substrate forming mold in embodiment 6 of the invention.
FIG. 17(b) is a side view of jig for adjusting the projecting amount of the abutting member of the substrate forming mold in embodiment 6 of the invention.
Figure 17:
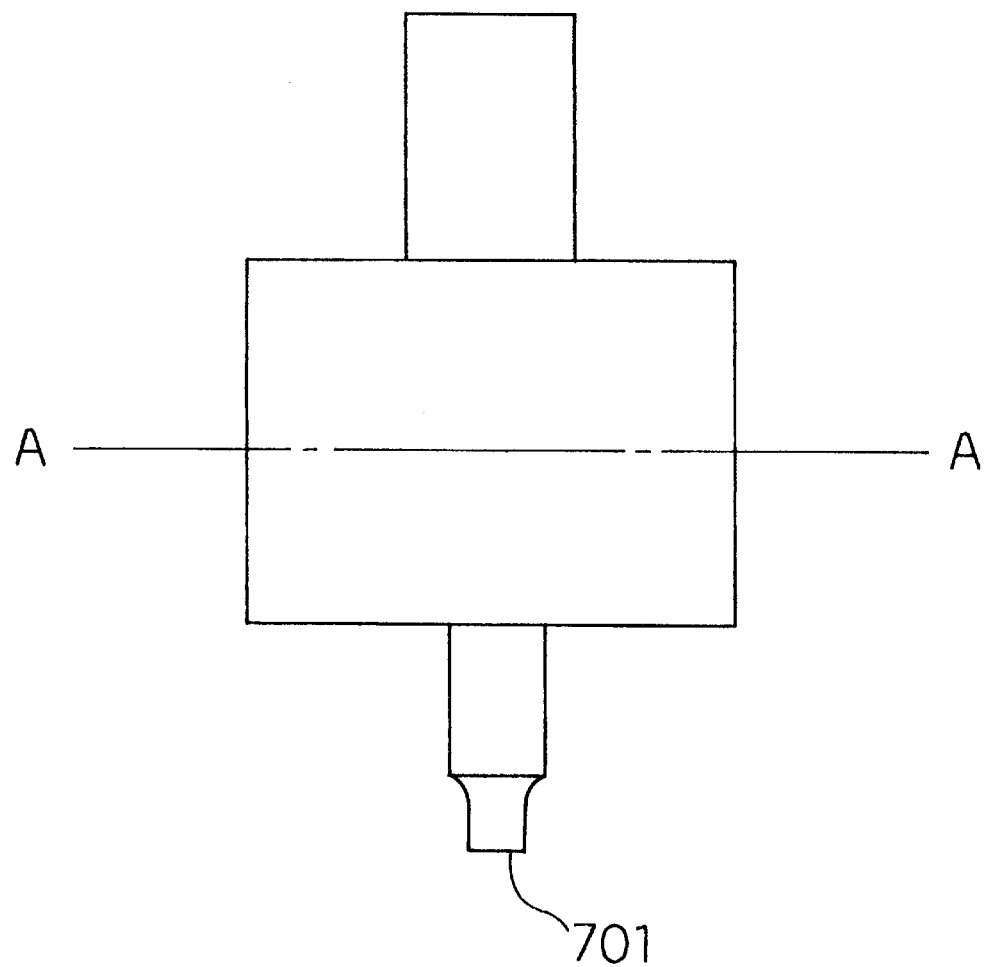

A structure for mechanically suppressing rotation of threads is shown in FIG. 16(f), (g). FIG. 16(f) is a sectional view, and FIG. 16(g) is a plan view as seen from the head side of the abutting member 26. A spot facing is formed in the surface of the stable mold base 8 at the position for inserting the abutting member 26, and a nut 27 is fitted to the abutting member 26 as locking means. By pressing the nut 27 to the stable mold base 8, the gap present in the threaded portions of the abutting member 26 and stable mold base 8 is eliminated, and rotation of the abutting member 26 is suppressed.

Of course, on the junction surface of the fixed bush 10 and stable mold base 8, an abutting member may be used instead of the shim 12.

(Embodiment 7)

Figure 18:
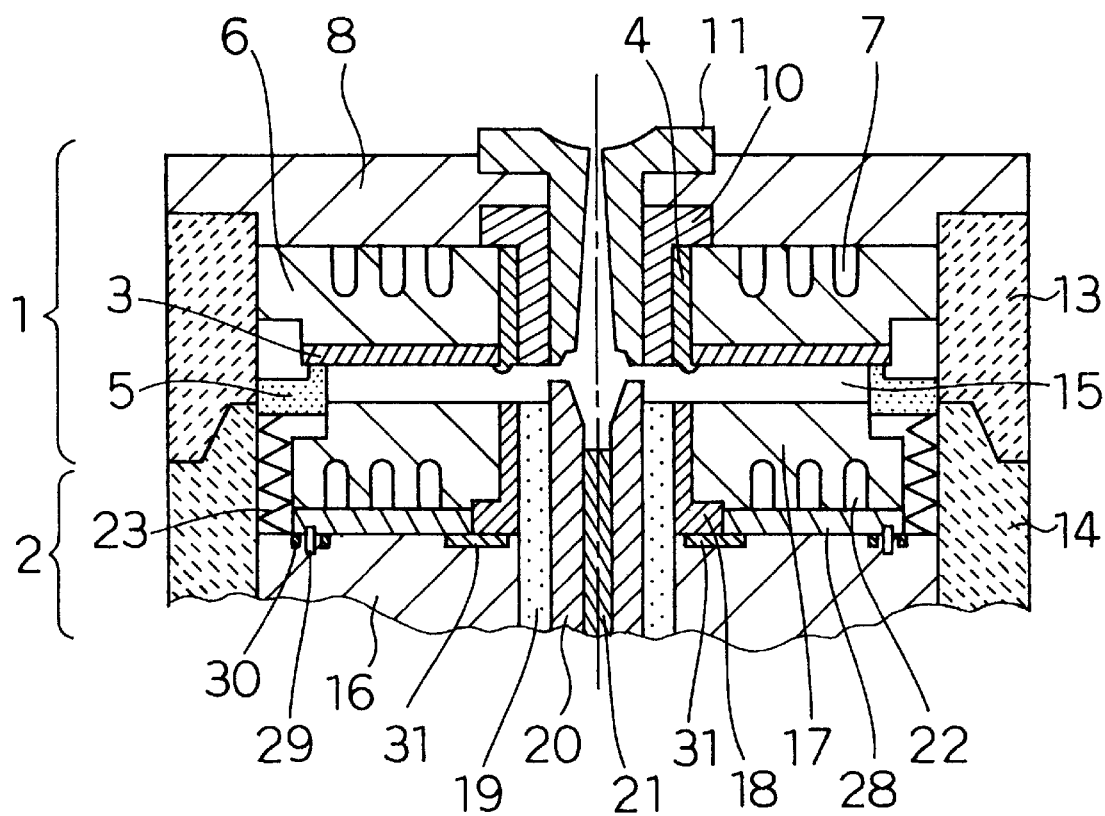
FIG. 18 is a sectional view showing a substrate forming mold in embodiment 7 of the invention.
Figure 19:
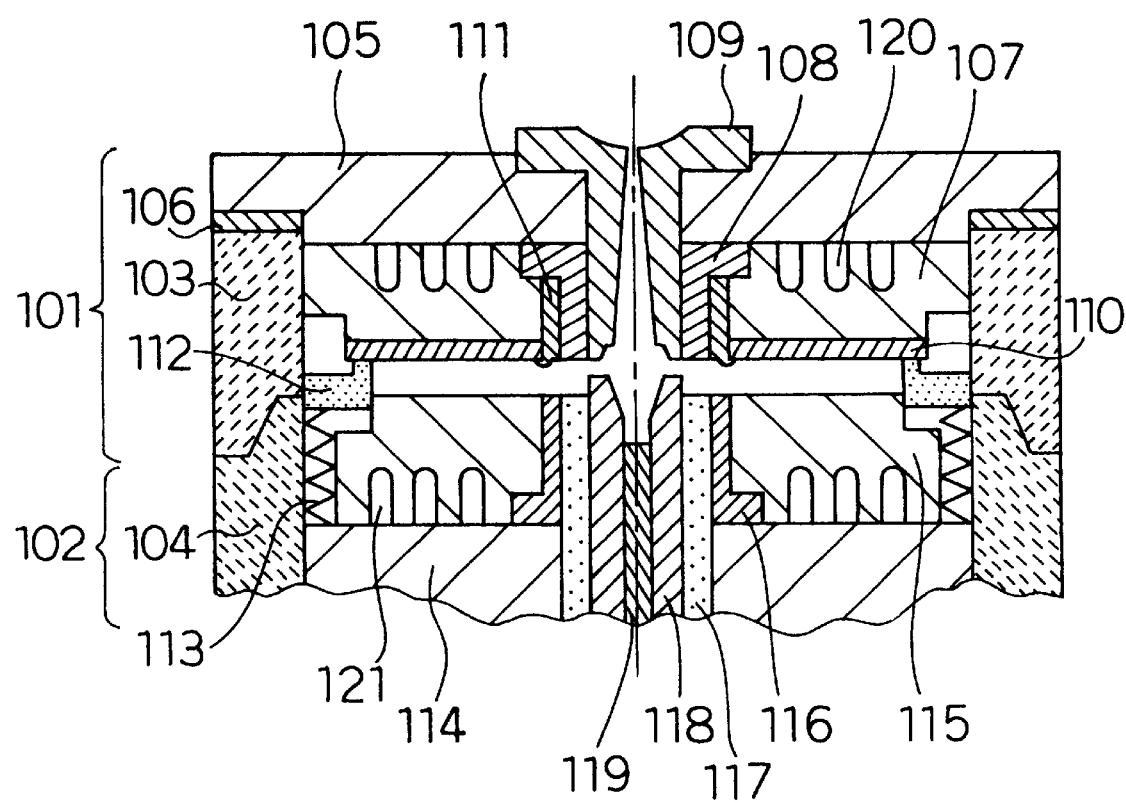
FIG. 19 is a sectional view showing a substrate forming mold in prior art.

A sectional view of embodiment 7 of substrate forming mold of the invention is shown in FIG. 18.

In the foregoing embodiments, the gap adjusting means is provided at the stable mold 1 side, but in embodiment 7, the gap adjusting means is provided at the movable mold 2 side.

So as to cover the temperature adjusting groove 22 of the movable mirror finished surface plate 17, a cover plate 28 is joined to the movable mirror finished surface plate 17, and the cover plate 28 is joined to the movable mold base 16.

At the outer side of the junction surface of the cover plate 28 and movable mold base 16, a pin 29 and a shim 30 are provided. The shim 30 has a hole for inserting the pin 29. A dent is formed in the cover plate 28 at the position corresponding to the pin 29, so that the pin 29 may not hit against. As the shim 30 is fitted with the pin 29, the shim 30 is fixed and is not moved.

A shim 31 is annular, and is stretched between the movable mold base 16 and cover plate 28, and between the movable mold base 16 and movable bush 18. According to this constitution, the movable mirror finished surface plate 17 and movable bush 18 are adjacent to each other, and contact with the movable mold base 16 within the same plane.

Fluctuations in the radial direction of the formed substrate are suppressed by the thickness adjustment of the shims 30 and shim 31, and fluctuations in the peripheral direction are suppressed by thickness adjustment in the peripheral direction of the shim 30.

As the shims 30, 31 used in the mold for forming a resin substrate of 15 mm in inner diameter, 120 mm in outer diameter, and 0.6 mm in plate thickness, those 10 mm and 20 mm in width respectively, and varying in thickness from 5 microns to 50 microns at 5-micron increments were prepared, and the experiment was conducted same as in the preceding embodiments. The forming conditions are same as in the foregoing embodiments.

As a result, in the conventional constitution without using shims, the maximum fluctuation of plate thickness in one formed substrate was 30 microns, but in the constitution of the embodiment using the shims 30, 31, the maximum fluctuation width was controlled to less than 10 microns.

In the foregoing embodiments, the cover plate for covering the temperature adjusting groove of the mirror finished surface plate is provided in the stable mold or movable mold, and pins and shims are used on the junction surface of the cover plate and mold base, but, of course, the pins and shims may be provided in both molds.

The pins may be fixed also at the cover plate, if not at the mold base side.

The sectional shape of pins and hole shape of shims may be any other than true roundness.

Thus, according to the invention, the plate thickness fluctuations in one formed substrate are less than 10 microns, and a high precision is obtained.

That is, the plate thickness of the formed substrate may be adjusted finely, and thickness fluctuations occurring in the radial direction or peripheral direction of the formed substrate may be decreased.

Moreover, if the forming operation is continued, the same precision is maintained, which is an outstanding effect.

As clear from the description herein, it is an advantage of the invention that thickness fluctuations of the formed substrate can be suppressed.

What is claimed is:

1. A substrate forming mold comprising:
    a plurality of substrate forming members for forming a substrate,
    a fixed base for holding a first substrate forming member of said plurality of substrate forming members,
    a moveable base for holding a second substrate forming member of said plurality of substrate forming members,
    a plurality of abutting members each having an inner portion, a first of said plurality of abutting members provided on said fixed base and a second of said plurality of said abutting members provided on said moveable base, said plurality of abutting members disposed for substantially enclosing said first and second substrate forming members, said first and second abutting members abutting against each other to produce a specified gap for forming said substrate between said first and said second substrate forming members, and
    gap adjusting means disposed between said first substrate forming member and said fixed base and/or between said second substrate forming member and said moveable base, disposed within said inner portion of said abutting members, and adapted for separately adjusting local sections of said gap.

2. A substrate forming mold of claim 1, wherein each of said first substrate forming member and said second substrate forming member, is formed of a plurality of mold constituent members, and said gap adjusting means are provided between at least one of said plurality of mold constituent members of said first substrate forming member and said fixed base and/or between at least one of said plurality of mold constituent members of said second substrate forming member and said moveable base.

3. A substrate forming mold of claim 1, further comprising a cover member,
    said cover member one of a) disposed between said fixed base and said first substrate forming member and wherein said first substrate forming member includes a groove formed adjacent said cover member, and b) disposed between said moveable base and said second substrate forming member and wherein said second substrate forming member includes a groove formed adjacent said cover member, said groove for passing fluid for temperature adjustment, and
    wherein said gap adjusting means are provided at least between said cover member and said corresponding one of said fixed base or said moveable base.

4. A substrate forming mold of claim 1, wherein said abutting members are substantially annular, said inner portions each include an inner wall, there is a step at the position where a junction surface of each said base and said corresponding substrate forming member, contacts said inner wall of said corresponding abutting member, and said gap adjusting means are disposed adjacent said inner wall at said step.

5. A substrate forming mold of claim 1, wherein a junction surface of each said base and said corresponding substrate forming member has a substantially annular gap, and said gap adjusting means are disposed within said annular gap.

6. A substrate forming mold of claim 1, wherein said gap adjusting means comprises at least one shim.

7. A substrate forming mold of claim 6, wherein said at least one shim comprises an annular shim.

8. A substrate forming mold of claim 6, wherein a junction surface is formed at a junction of each said base and said corresponding substrate forming member, and said at least one shim is disposed within an aperture provided along said junction surface for sandwiching said shim.

9. A substrate forming mold of claim 6, wherein a junction surface is formed at a junction of each said base and said corresponding substrate forming member, and a shim of said at least one shim includes a hole therethrough, and further comprising a pin, said pin penetrating through said hole and provided along said junction surface for sandwiching said shim.

10. A substrate forming mold of claim 9, wherein said at least one shim includes a plurality of holes therethrough, and further comprising a plurality of pins, each inserted into a corresponding hole of said plurality of holes.

11. A substrate forming mold of claim 9, wherein said pin and said hole are each shaped so that said shim may not rotate and move.

12. A substrate forming mold of claim 1, wherein said gap adjusting means comprise at least one protruding member screwed into one of said first substrate forming member, said second substrate forming member, said fixed base, and said moveable base, and wherein a gap dimension can be adjusted by rotating said at least one protruding member.

13. A substrate forming mold of claim 3, wherein said gap adjusting means comprise at least one protruding member screwed into one of said cover member, said fixed base cooperating with said cover member, and said moveable base cooperating with said cover member, and wherein a gap dimension can be adjusted by rotating said at least one protruding member.

14. A substrate forming mold of claim 12, wherein each protruding member includes an end surface having a groove therein, said groove used in rotating said protruding member.

15. A substrate forming mold of claim 14, further comprising, for each said protruding member, a rotation arresting member provided for preventing said protruding member from rotating past a pre-determined point.

16. A method for adjusting the plate thickness of a substrate formed within a substrate forming mold, said method comprising:

a) providing a pair of substrate forming members for forming a substrate;

b) providing a fixed base secured to a first substrate forming member out of said pair of substrate forming member;

c) providing a movable base secured to a second substrate forming member of said pair of substrate forming members;

d) providing a pair of abutting members, each including an inner portion;

e) affixing one of said pair of abutting members to said fixed base;

f) affixing the other of said pair of said abutting members to said movable base, said substrate forming members enclosed within said pair of abutting members;

g) positioning said pair of abutting members to produce a gap between the set of substrate forming members, said pair of abutting members abutting against each other;

h) providing gap adjusting means disposed between said first substrate forming member and said fixed base and/or between said second substrate forming member and said movable base, disposed within said inner portion of said abutting members, and adapted for separately adjusting local sections of said gap; and i) adjusting said gap.

17. A method for adjusting the plate thickness of a substrate formed within a substrate forming mold of claim 16, wherein each of said first substrate forming member and said second substrate forming member is formed of a plurality of mold constituent members, and wherein said gap adjusting means are provided between at least one of said plurality of mold constituent members of said first substrate forming member and said fixed base and/or between at least one of said plurality of mold constituent members of said second substrate forming member and said moveable base.

18. A method for adjusting the plate thickness of a substrate formed within a substrate forming mold of claim 16, further comprising the step of:

providing a cover member, said cover member one of a) disposed between said fixed base and said first substrate forming member and wherein said first substrate forming member includes a groove formed adjacent said cover member, and b) disposed between said moveable base and said second substrate forming member and wherein said second substrate forming member includes a groove formed adjacent said cover member, said groove for passing fluid for temperature adjustment, and wherein said gap adjusting means are provided between said cover member and said corresponding one of said fixed base or said moveable base.

19. A method for adjusting the plate thickness of a substrate formed within a substrate forming mold of claim 16, wherein said abutting members are substantially annular, said inner portions each include an inner wall, there is a step at the position where a junction surface of each said base and said corresponding substrate forming member contacts said inner wall of said corresponding abutting member, and said gap adjusting means are disposed adjacent said inner wall at said step.

20. A method for adjusting the plate thickness of a substrate formed within a substrate forming mold of claim 16, wherein a junction surface of each said base and said corresponding substrate forming member has a substantially annular gap, and said gap adjusting means are disposed within said annular gap.

21. A method for adjusting the plate thickness of a substrate formed within a substrate forming mold of claim 16, wherein said gap adjusting means comprise at least one shim having a thickness no greater than 50 microns and being coated with a heat resistant viscous fluid.

22. A method for adjusting the plate thickness of a substrate formed within a substrate forming mold of claim 16, wherein said gap adjusting means comprise at least one protruding member screwed into one of said first substrate forming member, said second substrate forming member, said fixed base, and said moveable base, and wherein said step of adjusting said gap comprises rotating at least one of said protruding members.

23. A method for adjusting the plate thickness of a substrate formed within a substrate forming mold of claim 18, wherein said gap adjusting means comprise at least one protruding member screwed into one of said cover member, said fixed base cooperating with said cover member, and said moveable base cooperating with said cover member, and wherein said step of adjusting said gap comprises rotating said at least one protruding member.

24. A substrate forming mold of claim 13, wherein each protruding member includes an end surface having a groove therein, said groove used in rotating said protruding member.

25. A substrate forming mold of claim 24, further comprising, for each protruding member, a rotation arresting member provided for preventing said protruding member from rotating past a pre-determined point.

26. A method for adjusting the plate thickness of a substrate formed within a substrate forming mold, said substrate forming mold comprising:

a plurality of substrate forming members for forming a substrate, a fixed base for holding a first substrate forming member of said plurality of substrate forming members, a moveable base for holding a second substrate forming member of said plurality of substrate forming members, and a plurality of abutting members each having an inner portion, a first of said plurality of abutting members provided on said fixed base and a second of said plurality of said abutting members provided on said moveable base, said plurality of abutting members disposed for substantially enclosing said first and second substrate forming members, said first and second abutting members abutting against each other to produce a specified gap for forming said substrate between said first and said second substrate forming members;

said method comprising:

a) providing gap adjusting means disposed between said first substrate forming member and said fixed base and/or between said second substrate forming member and said moveable base, disposed within said inner portion of said abutting members, and adapted for separately adjusting local sections of said gap; and b) adjusting said gap.

27. The method as in claim 16, wherein said step i) comprises separately adjusting local sections of said gap.

28. The method as in claim 26, wherein said step b) comprises separately adjusting local sections of said gap.

* * * * *